(12) United States Patent
Stacey et al.

(10) Patent No.: US 11,427,745 B2
(45) Date of Patent: Aug. 30, 2022

(54) AGGLOMERATED ZEOLITE CATALYST FOR CEMENT SLURRY YIELD ENHANCEMENT

(71) Applicant: Halliburton Energy Services, Inc., Houston, TX (US)

(72) Inventors: Juan Pablo Stacey, Quito (EC); Thomas Jason Pisklak, Cypress, TX (US); John Paul Bir Singh, Kingwood, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 304 days.

(21) Appl. No.: 16/639,820

(22) PCT Filed: Apr. 17, 2019

(86) PCT No.: PCT/US2019/027948
§ 371 (c)(1),
(2) Date: Feb. 18, 2020

(87) PCT Pub. No.: WO2020/214164
PCT Pub. Date: Oct. 22, 2020

(65) Prior Publication Data
US 2021/0130677 A1 May 6, 2021

(51) Int. Cl.
*C09K 8/473* (2006.01)
*C04B 14/04* (2006.01)
*C04B 18/02* (2006.01)
*C04B 28/04* (2006.01)
*E21B 33/14* (2006.01)
*C04B 111/40* (2006.01)

(52) U.S. Cl.
CPC ........... *C09K 8/473* (2013.01); *C04B 14/047* (2013.01); *C04B 18/021* (2013.01); *C04B 18/027* (2013.01); *C04B 28/04* (2013.01); *E21B 33/14* (2013.01); *C04B 2111/40* (2013.01)

(58) Field of Classification Search
CPC .................................................. E21B 33/138
See application file for complete search history.

(56) References Cited

U.S. PATENT DOCUMENTS

| | | | |
|---|---|---|---|
| 3,287,281 A | 11/1966 | Haden, Jr. et al. | |
| 6,964,302 B2 | 11/2005 | Luke et al. | |
| 6,989,057 B2 | 1/2006 | Getzlaf et al. | |
| 7,137,448 B2 | 11/2006 | Di Lullo Arias et al. | |
| 7,485,185 B2 | 2/2009 | Di Lullo Arias et al. | |
| 2003/0013601 A1 | 1/2003 | Cheng et al. | |
| 2004/0107877 A1* | 6/2004 | Getzlaf | C04B 28/02 106/781 |
| 2006/0108150 A1 | 5/2006 | Luke et al. | |

(Continued)

OTHER PUBLICATIONS

ISRWO International Search Report and Written Opinion for PCT/US2019/027948 dated Jan. 10, 2020.

(Continued)

*Primary Examiner* — William D Hutton, Jr.
*Assistant Examiner* — Avi T Skaist
(74) *Attorney, Agent, or Firm* — Thomas Rooney; C. Tumey Law Group PLLC

(57) ABSTRACT

A method of cementing may include preparing a cement composition comprising water, a hydraulic cement, and an agglomerated zeolite catalyst; placing the cement composition in a wellbore.

17 Claims, 5 Drawing Sheets

(56) References Cited

U.S. PATENT DOCUMENTS

2014/0000490 A1  1/2014  De La Roij
2014/0034313 A1* 2/2014  Pisklak ................... C04B 28/18
                                                            106/695
2014/0275349 A1  9/2014  Setliff et al.

OTHER PUBLICATIONS

YS Tseng, et al; Cement and Concrete Research 35 (2005) 782-787 "The pozzolanic activity of a calcined waste FCC catalyst and its effect on the compressive strength of cementitious materials".
HL Chen, et al; Cement & Concrete Composites 26 (2004) 657-664 "Spent FCC catalyst as a pozzolanic material for high-performance mortars".
Danutė Vaičiukynienė*, Audrius Grinys, Vitoldas Vaitkevičius, Aras Kantautas, Ceramics-Silikáty 59 (2) (2015) 103-108 "Purified waste FCC catalyst as a cement replacement material".
CMT, NeoCem Cement.

* cited by examiner

AGGLOMERATED ZEOLITE CATALYST FOR CEMENT SLURRY YIELD ENHANCEMENT

BACKGROUND

In cementing operations, such as well construction and remedial cementing, cement compositions are commonly utilized. Cement compositions may be used in primary cementing operations whereby pipe strings, such as casing and liners, are cemented in wellbores. In a typical primary cementing operation, a cement composition may be pumped into an annulus between the exterior surface of the pipe string disposed therein and the walls of the wellbore (or a larger conduit in the wellbore). The cement composition may set in the annular space, thereby forming an annular sheath of hardened, substantially impermeable material (e.g., a cement sheath) that may support and position the pipe string in the wellbore and may bond the exterior surface of the pipe string to the wellbore walls (or the larger conduit). Among other things, the cement sheath surrounding the pipe string should function to prevent the migration of fluids in the annulus, as well as protecting the pipe string from corrosion. Cement compositions also may be used in remedial cementing methods, such as in squeeze cementing for sealing voids in a pipe string, cement sheath, gravel pack, subterranean formation, and the like.

A design consideration for a cement composition may be slurry density. Providing a cement slurry with a density within a safe operational envelope may be important to ensure that the set cement provides effective zonal isolation. Most subterranean formations may have an upper density limit defined by the fracture gradient of the subterranean formation. If a cement has a high density whereby the pressure of the cement column on the subterranean formation exceeds the fracture gradient, the cement may cause the formation to fracture, leading to loss of cement and potential formation damage. Even if the cement does not fracture the formation, providing a cement with too high density may cause cement to leak off into the formation which may lead to formation damage and additional cost of cement to "make up" the cement lost. However, a lower density limit may be defined by the formation fluid pressure at the wellbore walls, for example. The cement composition generally must have sufficient density to minimize or prevent formation fluids from entering the wellbore before the cement has set. Without sufficient density, the formation fluids may flow into the cement column which may weaken the cement, and in extreme cases, may lead to a blowout.

Slurry density may be controlled by adjusting the amount of water in a cement composition. For example, a cement may be produced with relatively higher amounts of water if a lower density cement is desired or relatively lower amounts of water if a higher density cement is desired. There may also be lightweight cement additives such as hollow beads or other relatively low-density additives that may aid in lowering density as well as relatively high-density additives such as weighting agents which may increase density. However, adjusting cement density by changing water content or adding cement additives may affect other properties of the cement composition such as compressive strength, thickening time, rheology, fluid loss, free fluid, and fluid stability among others readily recognized by those of ordinary skill in the art. Furthermore, some additives may be incompatible with each other or require excessive water to hydrate.

BRIEF DESCRIPTION OF THE DRAWINGS

These drawings illustrate certain aspects of some of the examples of the present disclosure and should not be used to limit or define the disclosure.

DETAILED DESCRIPTION

Figure 1:
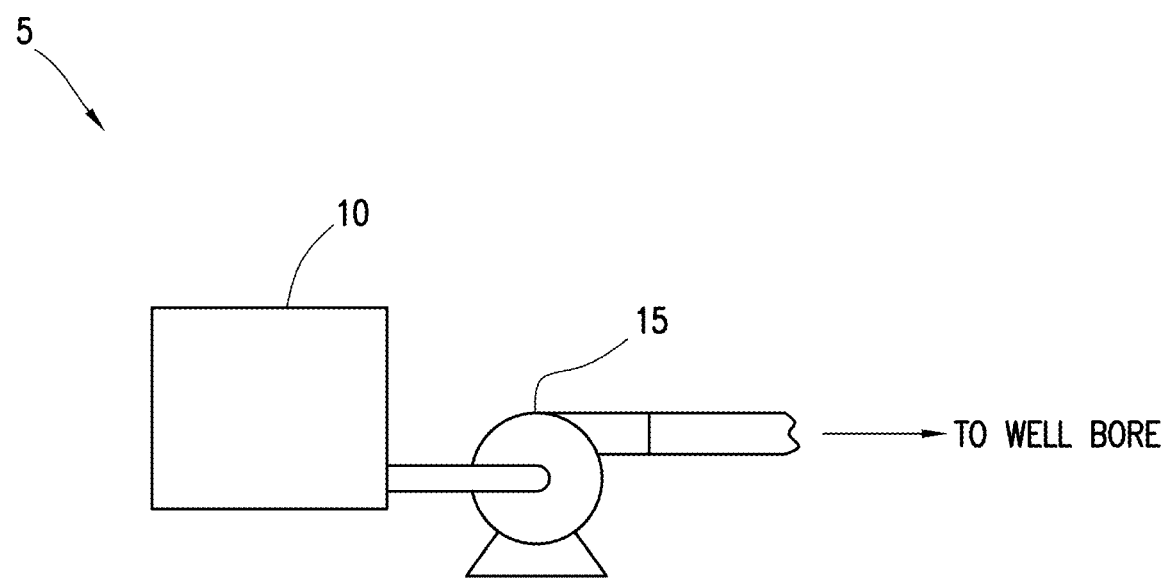
FIG. 1 is a schematic illustration of an example system for the preparation and delivery of a cement composition including agglomerated zeolite catalyst to a wellbore.

The present disclosure may relate to cementing, and in particular, to methods, compositions, and systems utilizing a cement composition including an agglomerated zeolite catalyst. Agglomerated zeolite catalyst may be a by-product material generated from a number of industrial refining and chemical processes such as hydrocracking and fluidized catalytic cracking.

Agglomerated zeolite catalysts (AZC) may be used in fluidized bed catalytic cracking (FCC) processes to convert low value, high molecular weight hydrocarbons into high value, low molecular weight hydrocarbons such as gasoline, propylene, isobutylene, and others. These catalysts, often referred to as FCC catalysts, may be primarily composed of small zeolite crystals that have been agglomerated with clays, binders, or other methods into spherical pellets with sizes typically ranging from 50 microns to 150 microns. FCC catalysts may have a limited life-span due to the gradual physical and chemical deactivation of the FCC catalyst. Chemical degradation may include reaction of a compound with the catalytic phase resulting in loss of reactivity of the catalytic phase. Catalyst poisoning may occur when a catalyst poison permanently deactivates the catalytic sites in the catalyst by binding to the site. Physical changes in the catalyst such as deposition and buildup of impurities may also reduce the catalytic activity. Catalysts may be regenerated multiple times, typically by high-temperature treatments, to burn off impurities and restore or increase the catalytic activity. High-temperature regeneration may also cause other physical changes within the catalyst such as transformation of the zeolite from a crystalline structure to an amorphous structure, for example. These physical and chemical changes may render the catalytic activity of the catalyst too low for the intended application, such as FCC. Once a catalyst has been utilized in the cracking process, or other industrial processes described below, the catalyst may be described as "spent." A spent catalyst may be a catalyst which has undergone physical and/or chemical changes such that the reactivity is reduced for its intended use.

In addition to FCC uses, AZCs may be encountered in many other industrial catalytic processes including, but not limited to, hydrocracking, gasoline desulfurization, light paraffin isomerization, reformate upgrading, distillate dewaxing by cracking, lube dewaxing by cracking, distillate dewaxing by isomerization, lube dewaxing by isomerization, diesel aromatics saturation, olefin skeletal isomerization, benzene reduction, light olefin interconversion, and olefin oligomerization to fuels and lubes, for example. In addition, AZCs may be found in separation applications including, but not limited to, drying, gas bulk separations/purification, n-Paraffins, iso-paraffins, and aromatics separation, biofilter media, absorbents for oil and spills, water/alcohol separations, water/olefin containing gas separations, carbon dioxide/ethylene and natural gas separations, removal of sulfur compounds from gas and liquified petroleum gas, nitrogen oxides/nitrogen separations, liquid bulk separations/purification, p-xylene/o-xylene, m-xylene separation, olefin/paraffin separations, fructose/glucose separation, and sulfur compounds/organics separations, for example. There may be uses for agglomerated zeolite catalyst in ion exchange applications such as, without limitation, water softening, water softening in detergents, water and waste water treatment, ammonia removal, removal of heavy metals, and soil treatment, for example.

AZCs are typically composed of four components: a matrix, a filler, a binder and zeolite crystals. Zeolites are microporous aluminosilicate minerals composed of silica and alumina tetrahedra. The zeolite component may be any zeolite such as, without limitation, type x, type y, ultra-stable type y, ZSM-5, SAPO-11, silicalite-1, mordenite, ferrierite, and beta. The binder may include an aluminate compound, and the filler may be a clay such as, without limitation, metakaolin, kaolin, attapulgite, bentonite, and others well known in the art. The matrix may be an amorphous solid that may include kaolin filler and silica sol binder, for example. In some examples, the AZC may additionally include components such as, without limitation, alumina, silica, phosphorous pentoxide, sulfur trioxide, calcium oxide, iron oxide, cobalt oxide, nickel oxide, molybdenum oxide, magnesium oxide and combinations thereof. The components of the AZC may be mixed together in slurry form and then spray dried to obtain spherical agglomerates. These agglomerates are then calcined at around 500° C. to obtain the final AZC.

The AZC may be included in a cement composition "as is," meaning that no additional treatment or processing is performed on the AZC before inclusion in the cement composition. As mentioned above, the AZC may be considered spent after the catalytic activity has decreased below a threshold level where the catalyst does not have enough remaining catalytic activity to continue to be used for the intended purpose. A spent AZC may be included in the cement composition as is without further treatment of the AZC. Alternatively, additional treatments may be performed on the spent AZC before inclusion in the cement composition, such as, cleaning, sintering, calcining, or other treatments.

AZCs may have many beneficial properties that make them suitable for inclusion in cement compositions, only some of which may be enumerated herein. For example, AZC may have a relatively high water requirement as compared to other cementitious components. A water requirement may be the water required to fully hydrate a cementitious component or additive. Water requirement is typically defined as the amount of mixing water that is required to be added to a powdered, solid material to form a slurry of a specified consistency. The consistency may vary for a particular application. Cement components may be analyzed to determine their water requirement. The following example technique for determining water requirement holds the consistency and amount of water constant while varying the amount of the solid material. However, techniques may also be applied that vary the amount of the water, the consistency, and/or the amount of solid material in any combination. The following technique also estimates the specified consistency based on the size of the vortex at the surface of the mixture in the blender. Water requirement for a particular cement component may be determined by a process that includes a) preparing a blender (e.g., Waring® blender) with a specified amount of water (e.g., about 100 grams to about 500 grams), b) agitating the water at a specified blender rpm (e.g., 4,000 to 15,000 rpm), c) adding the powdered solid that is being investigated to the water until a specified consistency is obtained, and d) calculating the water requirement based on the ratio of water to solids required to obtain the desired consistency. A specific example for determining water requirement may include, but is not limited to: 1) preparing a blender (e.g., Waring® blender) with a specified amount of water (e.g., about 100 grams to about 500 grams or about 200 grams in one example); 2) agitating the water at a specified blender rpm (e.g., about 4,000 to about 15,000 rpm or about 12,000 rpm in one example); 3) adding a specified amount (e.g., about 1 gram to about 1,000 grams or about 400 grams in one example) of the cement component to the water; 4) observing mixture to determine if a specified consistency is obtained, for example, the cement component can be considered thoroughly wet and mixed if the vortex formed at the surface of the mixture in the blender is about 0 inches (0 mm) to about 2 inch (50 mm) or about 0.004 inches (0.1 mm) to about 1 inch (25 mm); 5) if the desired consistency is not obtained, add more cement component until desired consistency is obtained, for example, the vortex formed in the blender is about the size of a dime; and 6) calculate the water requirement based on the ratio of water to cement component to obtain the desired consistency. In some examples, the specific consistency may be where a vortex at the surface of the mixture in the blender is the size of a dime or about 0.7 in (17.9 mm). Other suitable techniques for determining the water requirement may also be used as will be appreciated by those of ordinary skill in the art.

Some examples of AZC may have a water requirement at a point in a range of about 60 grams to about 150 grams of water per grams of AZC. Alternatively, the AZC may have water requirement at a point in a range of from about 60 to about 70 grams of water per grams of AZC, at a point in a range of from about 70 to about 80 grams of water per grams of AZC, at a point in a range of from about 80 to about 90 grams of water per grams of AZC, at a point in a range of from about 90 to about 100 grams of water per grams of AZC, at a point in a range of from about 100 to about 125 grams of water per grams of AZC, at a point in a range of from about 125 to about 150 grams of water per grams of AZC, or any points therebetween. Any ranges of water requirement disclosed herein are merely exemplary and the water requirement for any particular sample of AZC may fall outside the ranges explicitly recited. One of ordinary skill in the art, with the benefit of this disclosure should be able to determine a water requirement of any sample of AZC.

The water requirement of AZC may be a function of the physical properties of the AZC including porosity, pore volume, pore size, and internal surface area for example. Some examples of the AZC may have an average pore volume at a point in a range of from about 0.01 $cm^3/g$ to about 0.20 $cm^3/g$. Alternatively, the AZC may have an average pore volume at a point in a range of from about 0.01 $cm^3/g$ to about 0.05 $cm^3/g$, at a point in a range of from about 0.05 $cm^3/g$ to about 0.10 $cm^3/g$, at a point in a range of from about 0.10 cm³/g to about 0.15 cm³/g, at a point in a range of from about 0.15 cm³/g to about 0.20 cm³/g, or any points therebetween. Some examples of the AZC may have a multi-modal pore size distribution due to the pores of the zeolite being smaller in scale versus the pores associated with the matrix the zeolite is bound to. The pore size of the zeolite component of the AZC may exhibit an average pore size of in a range of from about 1 Å to about 50 Å. Alternatively, the zeolite component may have an average pore size at a point in a range of from about 1 Å to about 10 Å, at a point in a range of from 10 Å to about 20 Å, at a point in a range of from about 20 Å to about 30 Å, at a point in a range of from about 30 Å to about 40 Å, at a point in a range of from about 40 Å to about 50 Å, or any at any points therebetween. The pore size of the matrix component of the AZC may exhibit an average pore size at a point in a range of from about 1 nm to about 100 nm. Alternatively, the matrix component may have an average pore size at a point in a range of from about 1 nm to about 30 nm, at a point in a range of from 30 nm to about 60 nm, at a point in a range of from about 60 nm to about 100 nm, or any at any points therebetween.

Some examples of the AZC may have an average internal surface area as measured by the Brunauer-Emmett-Teller (BET) method at a point in a range of about 100 m²/g to about 250 m²/g. BET surface area may be a function of a plurality of factors, including, but not limited to the AZC manufacturing process, identity of the zeolite and matrix, and fouling from the reaction conditions the AZC was exposed to for example. Alternatively, the AZC may have a BET surface area at a point in a range of about 100 m²/g to about 150 m²/g, at a point in a range of about 150 m²/g to about 175 m²/g, at a point in a range of about 175 m²/g to about 200 m²/g, or any points therebetween. Any ranges of porosity, pore volume, pore size, and internal surface area of AZC disclosed herein are merely exemplary and the physical properties for any particular sample of AZC may fall outside the ranges explicitly recited. One of ordinary skill in the art, with the benefit of this disclosure, will be able to determine the physical properties associated with any sample of AZC.

As one of ordinary skill in the art will appreciate, a cement composition generally should have a water content that does not result in free water or separation of water from the bulk cement composition. Free water may be an aqueous phase that separates from a slurry or mixture of fluids. In cementing operations, free water is generally undesirable since channels tend to form through the set cement, providing potential gas migration paths. When processing reservoir fluids, the water that separates easily under gravity separation is known as free water. In some cases, additional water may be locked in an emulsion, contributing to the aqueous phase but not available as free water. As one of ordinary skill in the art will appreciate API RP 10B-2, *Recommended Practice for Testing Well Cements*, First Edition, July 2005 provides methods to determine free water for a cement composition. Free water may cause problems in wellbore cementing, especially in deviated wellbores such as horizontal wellbores. Water that separated from the bulk cement composition may migrate to the top of a conduit to be cemented resulting in pockets where the cement composition is not in contact with the subterranean formation. These pockets of free water may cause problems such as loss of zonal isolation, conduit corrosion, wellbore collapse, and other problems. It is therefore typically a requirement of cement compositions to have little to no free water present in the set composition. A common and inexpensive method to decrease cement slurry density may be to add additional water during preparation of the cement composition as water is typically less dense than other components in the cement composition. The additional water may allow the cement composition to be prepared to lower densities but may also result in free water separating from the cement composition as the cement composition is introduced into a wellbore and allowed set. However, the addition of AZC may allow higher weight ratios of water to be included in a cement composition as the may act as a water extender by taking up additional water added to a cement composition. Methods of designing a cement composition using the water requirement of AZC and other cement components will be discussed in detail below.

Figure 5:
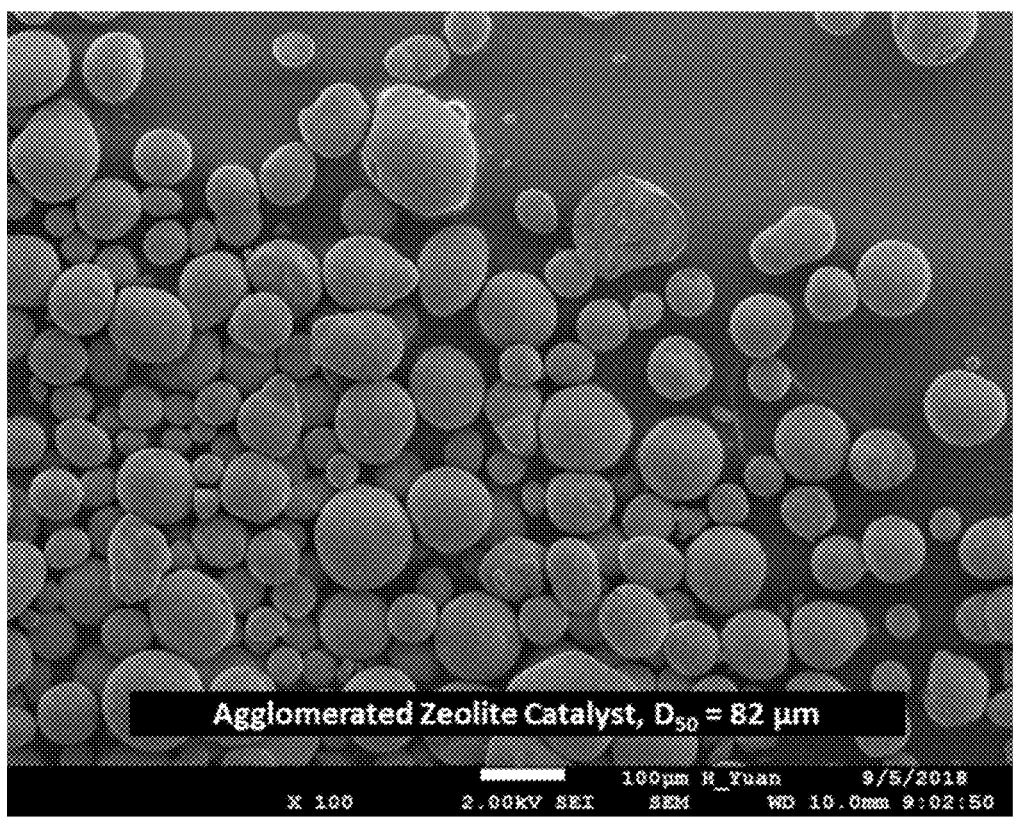
FIG. 5 is a scanning electron micrograph of an agglomerated zeolite catalyst sample.

The AZCs may have any particle size (d50) suitable for a particular application, including at a point in a range of from about 10 μm to about 200 μm. The particle size corresponds to d50 values as measured by particle size analyzers such as those manufactured by Malvern Instruments, Worcestershire, United Kingdom. Alternatively, the AZC may have a particle size in a range of from about 10 μm to about 50 μm, at a point in a range of from about 50 μm to about 100 μm, at a point in a range of from about 100 μm to about 150 μm, at a point in a range of from about 150 μm to about 200, or any points therebetween. One of ordinary skill in the art, with the benefit of this disclosure, should be able to select an appropriate particle size of AZC to include in a cement composition. FIG. 5 is a scanning electron micrograph of a sample of AZC. It can be observed that the particular sample of AZC has a $D_{50}$ particle size of 82 μm.

The AZCs may have any specific gravity suitable for a particular application. One of the potential advantages of including an AZC in a cement composition is that AZC is a relatively low-density material owing to the porosity of the AZC. Some examples of AZC may have a specific gravity at a point in a range of about 1.7 to about 3.3. Alternatively, the AZC may have a specific gravity at a point in a range of from about 1.7 to about 2, at a point in a range of from about 2 to about 2.3, at a point in a range of from about 2.3 to about 2.6, at a point in a range of from about 2.6 to about 3, at a point in a range of from about 3 to about 3.3, or any ranges therebetween. Any specific gravity disclosed herein are merely exemplary and the specific gravity for any particular sample of AZC may fall outside the ranges explicitly recited. One of ordinary skill in the art, with the benefit of this disclosure, should be able to determine the specific gravity associated with any sample of AZC.

A cement composition may include cement, water, and agglomerated zeolite catalyst. Generally, the AZC may be added to the cement composition in any desired concentration, including at a point in a range of from about 1% to about 80% by weight of the cement composition. Alternatively, the AZC may be present in the cement composition at a point in a range of from about 1% to about 10% by weight of the cement composition, at a point in a range of from about 10% to about 20% by weight of the cement composition, at a point in a range of from about 20% to about 30% by weight of the cement composition, at a point in a range of from about 30% to about 40% by weight of the cement composition, at a point in a range of from about 40% to about 50% by weight of the cement composition, at a point in a range of from about 50% by weight of the cement composition to about 60% by weight of the cement composition, at a point in a range of from about 60% to about 70% by weight of the cement composition, at a point in a range of from about 70% to about 80% by weight of the cement composition, or any points therebetween. One of ordinary skill in the art, with the benefit of this disclosure, should be able to select an appropriate amount of AZC to include in a cement composition. Additionally, a cement composition may be prepared with the major component being the AZC with little to no other components that set hydraulically in the presence of water. For example, a composition may be prepared which includes water, lime, and AZC in a weight ratio of about 3:1 to about 5:1 AZC to lime.

The water may be from any source provided that it does not contain an excess of compounds that may undesirably affect other components in the cement compositions. For example, a cement composition may include fresh water, salt water such as brine (e.g., saturated saltwater produced from subterranean formations) or seawater, or any combination thereof. Salt water generally may include one or more dissolved salts therein and may be saturated or unsaturated as desired for a particular application. Seawater or brines may be suitable for use in some examples of the cement composition. Further, the water may be present in an amount sufficient to form a pumpable slurry. Generally, the water may be added to the cement composition in any desired concentration, including at a point in a range of from about 10% to about 80% by weight of the cement composition. Alternatively, the water may be present in the cement composition at a point in a range of from an amount of about 10% to about 30% by weight of the cement composition, at a point in a range of from about 30% to about 50% by weight of the cement composition, at a point in a range of from about 50% to about 60% by weight of the cement composition, at a point in a range of from about 60% to about 70% by weight of the cement composition, at a point in a range of from about 70% to about 80% by weight of the cement composition or any points therebetween. One of ordinary skill in the art, with the benefit of this disclosure, should be able to select an appropriate amount of water to include in a cement composition.

The cement composition may have a density suitable for a particular application. By way of example, the cement composition may have a density at a point in a range of from about of from about 4 pounds per gallon ("lb/gal") (479 kg/m$^3$) to about 20 lb/gal (2396 kg/m$^3$). Alternatively, the cement composition may have a density at a point in a range of from about 4 lb/gal (479 kg/m$^3$) to about 7 lb/gal (839 kg/m$^3$), at a point in a range of from about 7 lb/gal (839 kg/m$^3$) to about 10 (1198 kg/m$^3$), at a point in a range of from about 10 lb/gal (1198 kg/m$^3$) to about 13 lb/gal (1558 kg/m$^3$), at a point in a range of from about 13 lb/gal (1558 kg/m$^3$), to about 16 lb/gal, at a point in a range of from about 16 lb/gal to about 20 lb/gal, or any points therebetween. As discussed above, the density of cement may be an important design factor as the density range of cement may be limited by the formation properties. One method to control density may be to increase the fraction of water included in the cement composition. However, increasing water fraction generally leads to a cement with a lower compressive strength and increased free water which may be unsuitable for some applications. One of the potential advantages of including AZC in the cement composition is that AZC is a relatively low-density material compared to other cementitious components, has a high water requirement, and has pozzolanic activity that may contribute to compressive strength. Pozzolanic activity may be the ability of a compound to react with lime, typically in the form of hydrated lime, to form a hardened mass. Cement compositions prepared with AZC may be prepared to lower densities than neat cement compositions which do not contain AZC. AZC may absorb excess water resulting in more stable cement compositions with reduced free water and increased compressive strength. As will be illustrated in the examples below, cement compositions which include AZC may have higher compressive strengths as compared to neat cement compositions which do not include AZC at the same densities. The cement compositions may be foamed or unfoamed or may include other means to reduce their densities, such as hollow microspheres, low-density elastic beads, or other density-reducing additives known in the art. One of ordinary skill in the art, with the benefit of this disclosure, should be able to select an appropriate density for a particular application.

The cement compositions may include any number of additional cement additives. The cement compositions may include a pozzolan such as fly ash, silica fume, metakaolin, volcanic glasses, other natural glasses or combinations thereof. An example of a suitable pozzolan may include fly ash. A variety of fly ash may be suitable, including fly ash classified as Class C and Class F fly ash according to American Petroleum Institute, API Specification for Materials and Testing for Well Cements, API Specification 10, Fifth Ed., Jul. 1, 1990. Class C fly ash includes both silica and lime, so it may set to form a hardened mass upon mixing with water. Class F fly ash generally does not contain a sufficient amount of lime to induce a cementitious reaction, therefore, an additional source of calcium ions is necessary for a cement composition including Class F fly ash. In some examples, lime may be mixed with Class F fly ash in an amount in the range of about 0.1% to about 100% by weight of the fly ash. In some instances, the lime may be hydrated lime. An example of a suitable pozzolan may include metakaolin. Generally, metakaolin is a white pozzolan that may be prepared by heating kaolin clay to temperatures in the range of about 600° to about 800° C. Where used, the metakaolin may be present in an amount in the range of from about 0.1% to about 40% by weight of the cement composition. For example, the metakaolin may be present in an amount ranging between any of and/or including any of about 0.1%, 10%, about 20%, about 30%, or about 40% by weight of the cement composition. One of ordinary skill in the art, with the benefit of this disclosure, should recognize the appropriate amount of the metakaolin to include for a chosen application. An additional example of a suitable pozzolan may include a natural pozzolan. Natural pozzolans are generally present on the Earth's surface and set and harden in the presence of hydrated lime and water. Examples including of natural pozzolans may include natural glasses, diatomaceous earth, volcanic ash, opaline shale, tuff, and combinations thereof. The natural pozzolans may be ground or unground. Generally, the natural pozzolans may have any particle size distribution as desired for a particular application.

The cement compositions may further include hydrated lime. As used herein, the term "hydrated lime" will be understood to mean calcium hydroxide. In some examples, the hydrated lime may be provided as quicklime (calcium oxide) which hydrates when mixed with water to form the hydrated lime. The hydrated lime may be included in examples of the cement compositions, for example, to form a hydraulic composition with the pozzolan or AZC. For example, the hydrated lime may be included in a pozzolan or AZC-to-hydrated-lime weight ratio of about 10:1 to about 1:1 or a ratio of about 3:1 to about 5:1. Where present, the hydrated lime may be included in the cement compositions in an amount at a point in a range of from about 1% to about 40% by weight of the cement composition, for example. In some examples, the hydrated lime may be present in an amount ranging between any of and/or including any of about 1%, about 10%, about 20%, about 30%, or about 40% by weight of the cement composition. In some examples, the cementitious components present in the cement composition may consist essentially of AZC and hydrated lime. For example, the cementitious components may primarily include the AZC and the hydrated lime without any additional cementitious components (e.g., Portland cement) that hydraulically set in the presence of water. One of ordinary skill in the art, with the benefit of this disclosure, will recognize the appropriate amount of hydrated lime to include for a chosen application.

The cement composition may further include a set retarder. A broad variety of set retarders may be suitable for use in the cement compositions. For example, the set retarder may include phosphonic acids, such as ethylenediamine tetra(methylene phosphonic acid), diethylenetriamine Penta(methylene phosphonic acid), lignosulfonates, such as sodium lignosulfonate, calcium lignosulfonate, salts such as stannous sulfate, lead acetate, monobasic calcium phosphate, organic acids, such as citric acid, tartaric acid, cellulose derivatives such as hydroxyl ethyl cellulose (HEC) and carboxymethyl hydroxyethyl cellulose (CMHEC), synthetic co- or ter-polymers including sulfonate and carboxylic acid groups such as sulfonate-functionalized acrylamide-acrylic acid co-polymers; borate compounds such as alkali borates, sodium metaborate, sodium tetraborate, potassium pentaborate; derivatives thereof, or mixtures thereof. Examples of suitable set retarders include, among others, phosphonic acid derivatives. Generally, the set retarder may be present in the cement compositions in an amount sufficient to delay the setting for a desired time. In some examples, the set retarder may be present in the cement compositions in an amount in the range of from about 0.01% to about 10% by weight of the cement composition. In specific examples, the set retarder may be present in an amount ranging between any of and/or including any of about 0.01%, about 0.1%, about 1%, about 2%, about 4%, about 6%, about 8%, or about 10% by weight of by weight of the cement composition. One of ordinary skill in the art, with the benefit of this disclosure, will recognize the appropriate amount of the set retarder to include for a chosen application.

In some examples, a dispersant may be included in the cement compositions in an amount in the range of from about 0.01% to about 5% by weight of the cement composition. In specific examples, the dispersant may be present in an amount ranging between any of and/or including any of about 0.01%, about 0.1%, about 0.5%, about 1%, about 2%, about 3%, about 4%, or about 5% by weight of the cement composition. One of ordinary skill in the art, with the benefit of this disclosure, will recognize the appropriate amount of the dispersant to include for a chosen application.

Some examples of the cement compositions may include silica sources in addition to the AZC; for example, crystalline silica and/or amorphous silica. Crystalline silica is a powder that may be included in examples of the cement compositions, for example, to prevent cement compressive strength retrogression. Amorphous silica is a powder that may be included in examples of the cement compositions as a lightweight filler and/or to increase cement compressive strength. Amorphous silica is generally a byproduct of a ferrosilicon production process, wherein the amorphous silica may be formed by oxidation and condensation of gaseous silicon suboxide, SiO, which is formed as an intermediate during the process. Examples including additional silica sources may utilize the additional silica source as needed to enhance compressive strength or set times.

Other additives suitable for use in subterranean cementing operations also may be included in examples of the cement compositions. Examples of such additives include, but are not limited to weighting agents, lightweight additives, gas-generating additives, mechanical-property-enhancing additives, lost-circulation materials, filtration-control additives, fluid-loss-control additives, defoaming agents, foaming agents, thixotropic additives, and combinations thereof. In examples, one or more of these additives may be added to the cement compositions after storing but prior to the placement of a cement composition into a wellbore. A person having ordinary skill in the art, with the benefit of this disclosure, should readily be able to determine the type and amount of additive useful for a particular application and desired result.

In some examples, the cement compositions may set to have a desirable compressive strength after activation. Compressive strength is generally the capacity of a material or structure to withstand axially directed pushing forces. The compressive strength may be measured at a specified time after the cement composition has been activated and the resultant composition is maintained under specified temperature and pressure conditions. Compressive strength can be measured by either destructive or non-destructive methods. The destructive method physically tests the strength of treatment fluid samples at various points in time by crushing the samples in a compression-testing machine. The compressive strength is calculated from the failure load divided by the cross-sectional area resisting the load and is reported in units of pound-force per square inch (psi). Non-destructive methods may employ a USA™ ultrasonic cement analyzer, available from Fann Instrument Company, Houston, Tex. Compressive strength values may be determined in accordance with API RP 10B-2, *Recommended Practice for Testing Well Cements*, First Edition, July 2005.

By way of example, the cement compositions may develop a 24-hour compressive strength in the range of from about 50 psi to about 5000 psi, alternatively, from about 100 psi to about 4500 psi, or alternatively from about 500 psi to about 4000 psi. In some examples, the cement compositions may develop a compressive strength in 24 hours of at least about 50 psi, at least about 100 psi, at least about 500 psi, or more. In some examples, the compressive strength values may be determined using destructive or non-destructive methods at a temperature ranging from 100° F. to 200° F.

In some examples, the cement compositions may have desirable thickening times after activation. Thickening time typically refers to the time a fluid, such as a cement composition, remains in a fluid state capable of being pumped. Several different laboratory techniques may be used to measure thickening time. A pressurized consistometer, operated in accordance with the procedure set forth in the aforementioned API RP Practice 10B-2, may be used to measure whether a fluid is in a pumpable fluid state. The thickening time may be the time for the treatment fluid to reach 70 Bc and may be reported as the time to reach 70 Bc. In some examples, the cement compositions may have a thickening time of greater than about 1 hour, alternatively, greater than about 2 hours, alternatively greater than about 5 hours at 3,000 psi and temperatures in a range of from about 50° F. to about 400° F., alternatively, in a range of from about 80° F. to about 250° F., and alternatively at a temperature of about 140° F.

Examples may include the addition of a cement set activator to the cement compositions. Examples of suitable cement set activators include, but are not limited to: amines such as triethanolamine, diethanolamine; silicates such as sodium silicate; zinc formate; calcium acetate; Groups IA and IIA hydroxides such as sodium hydroxide, magnesium hydroxide, and calcium hydroxide; monovalent salts such as sodium chloride; divalent salts such as calcium chloride; nanosilica (i.e., silica having a particle size of less than or equal to about 100 nanometers); polyphosphates; and combinations thereof. In some examples, a combination of the polyphosphate and a monovalent salt may be used for activation. The monovalent salt may be any salt that dissociates to form a monovalent cation, such as sodium and potassium salts. Specific examples of suitable monovalent salts include potassium sulfate, and sodium sulfate. A variety of different polyphosphates may be used in combination with the monovalent salt for activation of the cement compositions, including polymeric metaphosphate salts, phosphate salts, and combinations thereof. Specific examples of polymeric metaphosphate salts that may be used include sodium hexametaphosphate, sodium trimetaphosphate, sodium tetrametaphosphate, sodium pentametaphosphate, sodium heptametaphosphate, sodium octametaphosphate, and combinations thereof. A specific example of a suitable cement set activator includes a combination of sodium sulfate and sodium hexametaphosphate. In particular examples, the activator may be provided and added to the cement composition as a liquid additive, for example, a liquid additive including a monovalent salt, a polyphosphate, and optionally a dispersant.

As will be appreciated by those of ordinary skill in the art, examples of the cement compositions may be used in a variety of subterranean operations, including primary and remedial cementing. The cement composition may be introduced into a wellbore and allowed to set therein. As used herein, introducing the cement composition into a subterranean formation includes introduction into any portion of the subterranean formation, including, without limitation, into a wellbore drilled into the subterranean formation, into a near wellbore region surrounding the wellbore, such as a subterranean formation, or into both. Examples may further include activation of the cement composition. The activation of the cement composition may include, for example, the addition of a cement set activator to the cement composition.

In primary cementing examples, for example, examples of the cement composition may be introduced into an annular space between a conduit located in a wellbore and the walls of a wellbore (and/or a larger conduit in the wellbore), wherein the wellbore penetrates the subterranean formation. The cement composition may be allowed to set in the annular space to form an annular sheath of hardened cement. The cement composition may form a barrier that prevents the migration of fluids in the wellbore. The cement composition may also, for example, support the conduit in the wellbore.

In remedial cementing examples, a cement composition may be used, for example, in squeeze-cementing operations or in the placement of cement plugs. By way of example, the composition may be placed in a wellbore to plug an opening (e.g., a void or crack) in the formation, in a gravel pack, in the conduit, in the cement sheath, and/or between the cement sheath and the conduit (e.g., a microannulus).

The cement component may further include hydraulic cement. Any of a variety of hydraulic cements may be suitable including those including calcium, aluminum, silicon, oxygen, iron, and/or sulfur, which set and harden by reaction with water. Specific examples of hydraulic cements that may be suitable include, but are not limited to, Portland cements, pozzolana cements, gypsum cements, alumina based cements, silica cements, and any combination thereof. Examples of suitable Portland cements may include those classified as Classes A, B, C, G, or H cements according to American Petroleum Institute, *API Specification for Materials and Testing for Well Cements*, API Specification 10, Fifth Ed., Jul. 1, 1990. Additional examples of suitable Portland cements may include those classified as ASTM Type I, II, III, IV, or V.

The hydraulic cement may be included in the cement compositions in an amount suitable for a particular application. The concentration of the hydraulic cement may also be selected, for example, to provide a particular compressive strength for the cement composition after setting. Where used, the hydraulic cement may be included in an amount in a range of from about 1% to about 80% by weight of the cement composition. By way of example, the hydraulic cement may be present in an amount ranging between any of and/or including any of about 1%, about 5%, about 10%, about 20%, about 30%, about 40%, about 50%, about 60%, about 70%, or about 80% by weight of the cement composition. In one particular example, the hydraulic cement may be present in an amount in a range of from about 25% to about 75% by weight of the cement composition and, alternatively, from about 40% to 60% by weight of the cement composition. One of ordinary skill in the art, with the benefit of this disclosure, should recognize the appropriate amount of the hydraulic cement to include for a chosen application.

The cement component may further include kiln dust. "Kiln dust," as that term is used herein, refers to a solid material generated as a by-product of the heating of certain materials in kilns. The term "kiln dust" as used herein is intended to include kiln dust made as described herein and equivalent forms of kiln dust. Depending on its source, kiln dust may exhibit cementitious properties in that it can set and harden in the presence of water. Examples of suitable kiln dusts include cement kiln dust, lime kiln dust, and combinations thereof. Cement kiln dust may be generated as a by-product of cement production that is removed from the gas stream and collected, for example, in a dust collector. Usually, large quantities of cement kiln dust are collected in the production of cement that are commonly disposed of as waste. Disposal of the cement kiln dust can add undesirable costs to the manufacture of the cement, as well as the environmental concerns associated with its disposal. The chemical analysis of the cement kiln dust from various cement manufactures varies depending on a number of factors, including the particular kiln feed, the efficiencies of the cement production operation, and the associated dust collection systems. Cement kin dust generally may include a variety of oxides, such as $SiO2$, $Al_2O_3$, $Fe_2O_3$, CaO, MgO, $SO_3$, $Na_2O$, and $K_2O$. Problems may also be associated with the disposal of lime kiln dust, which may be generated as a by-product of the calcination of lime. The chemical analysis of lime kiln dust from various lime manufacturers varies depending on several factors, including the particular limestone or dolomitic limestone feed, the type of kiln, the mode of operation of the kiln, the efficiencies of the lime production operation, and the associated dust collection systems. Lime kiln dust generally may include varying amounts of free lime and free magnesium, lime stone, and/or dolomitic limestone and a variety of oxides, such as $SiO2$, $Al_2O_3$, $Fe_2O_3$, CaO, MgO, $SO_3$, $Na_2O$, and $K_2O$, and other components, such as chlorides.

The kiln dust may be included in the cement compositions in an amount suitable for a particular application. The concentration of kiln dust may also be selected to provide a low-cost replacement for higher cost additives, such as Portland cement, that may typically be included in a particular cement composition. Where present, the kiln dust may be included in an amount in a range of from about 1% to about 80% by weight of the cement composition. By way of example, the kiln dust may be present in an amount ranging between any of and/or including any of about 1%, about 5%, about 10%, about 20%, about 30%, about 40%, about 50%, about 60%, about 70%, or about 80% by weight of the cement composition. In one example, the kiln dust may be present in an amount in a range of from about 25% to about 75% by weight of the cement composition and, alternatively, from about 40% to 60% by weight of the cement composition. One of ordinary skill in the art, with the benefit of this disclosure, should recognize the appropriate amount of kiln dust to include for a chosen application.

In some embodiments, the cement component may further include one or more of slag, perlite, shale, amorphous silica, or metakaolin. These additives may be included in the cement component to improve one or more properties of the cement composition, including mechanical properties such as compressive strength.

The cement component may further include slag. Slag is generally a granulated, blast furnace by-product from the production of cast iron including the oxidized impurities found in iron ore. The slag may be included in examples of the slag compositions in an amount suitable for a particular application. Where used, the slag may be present in an amount in the range of from about 0.1% to about 40% by weight of the cement composition. For example, the slag may be present in an amount ranging between any of and/or including any of about 0.1%, about 10%, about 20%, about 30%, or about 40% by weight of the cement composition. One of ordinary skill in the art, with the benefit of this disclosure, should recognize the appropriate amount of the slag to include for a chosen application.

The cement component may further include perlite. Perlite is an ore and generally refers to a naturally occurring volcanic, amorphous siliceous rock including mostly silicon dioxide and aluminum oxide. The perlite may be expanded and/or unexpanded as suitable for a particular application. The expanded or unexpanded perlite may also be ground, for example. Where used, the perlite may be present in an amount in the range of from about 0.1% to about 40% by weight of the cement composition. For example, the perlite may be present in an amount ranging between any of and/or including any of about 0.1%, about 10%, about 20%, about 30%, or about 40% by weight of the cement composition. One of ordinary skill in the art, with the benefit of this disclosure, should recognize the appropriate amount of the perlite to include for a chosen application.

The cement component may further include shale in an amount sufficient to provide the desired compressive strength, density, and/or cost. A variety of shales are suitable, including those including silicon, aluminum, calcium, and/or magnesium. Suitable examples of shale include, but are not limited to, PRESSUR-SEAL® FINE LCM material and PRESSUR-SEAL® COARSE LCM material, which are commercially available from TXI Energy Services, Inc., Houston, Tex. Examples of suitable shales include vitrified shale and/or calcined shale. Where used, the shale may be present in an amount in the range of from about 0.1% to about 40% by weight of the cement composition. For example, the shale may be present in an amount ranging between any of and/or including any of about 0.1%, about 10%, about 20%, about 30%, or about 40% by weight of the cement composition. One of ordinary skill in the art, with the benefit of this disclosure, should recognize the appropriate amount of the shale to include for a chosen application.

The cement component may further include amorphous silica. Amorphous silica is generally a byproduct of a ferrosilicon production process, wherein the amorphous silica may be formed by oxidation and condensation of gaseous silicon suboxide, SiO, which is formed as an intermediate during the process. Where used, the amorphous silica may be present in an amount in the range of from about 0.1% to about 40% by weight of the cement composition. For example, the amorphous silica may be present in an amount ranging between any of and/or including any of about 0.1%, about 10%, about 20%, about 30%, or about 40% by weight of the cement composition. One of ordinary skill in the art, with the benefit of this disclosure, should recognize the appropriate amount of the amorphous silica to include for a chosen application.

Optionally, the cement compositions may be foamed with a foaming additive and a gas, for example, to provide a composition with a reduced density. For example, a cement composition may be foamed to have a density of about 12 lbs/gal or less, about 11 lbs/gal or less, or about 10 lbs/gal or less. By way of further example, the cement composition may be foamed to have a density in a range of from about from about 4 lbs/gal to about 12 lbs/gal and, alternatively, about 7 lbs/gal to about 9 lbs/gal. The gas used for foaming the cement compositions may be any suitable gas for foaming the cement composition, including, but not limited to air, nitrogen, and combinations thereof. Generally, the gas may be present in the cement composition in an amount sufficient to form the desired foam. For example, the gas may be present in an amount in the range of from about 5% to about 80% by volume of the foamed cement composition at atmospheric pressure, alternatively, about 5% to about 55% by volume, and, alternatively, about 15% to about 30% by volume.

Optionally, foaming additives may be included in the cement compositions to, for example, facilitate foaming and/or stabilize the resultant foam formed therewith. The foaming additive may include a surfactant or combination of surfactants that reduce the surface tension of the water. By way of example, the foaming agent may include an anionic, nonionic, amphoteric (including zwitterionic surfactants), cationic surfactant, or mixtures thereof. Examples of suitable foaming additives include, but are not limited to: betaines; anionic surfactants such as hydrolyzed keratin; amine oxides such as alkyl or alkene dimethyl amine oxides; cocoamidopropyl dimethylamine oxide; methyl ester sulfonates; alkyl or alkene amidobetaines such as cocoamidopropyl betaine; alpha-olefin sulfonates; quaternary surfactants such as trimethyltallowammonium chloride and trimethylcocoammonium chloride; C8 to C22 alkylethoxylate sulfates; and combinations thereof. Specific examples of suitable foaming additives include, but are not limited to: mixtures of an ammonium salt of an alkyl ether sulfate, a cocoamidopropyl betaine surfactant, a cocoamidopropyl dimethylamine oxide surfactant, sodium chloride, and water; mixtures of an ammonium salt of an alkyl ether sulfate surfactant, a cocoamidopropyl hydroxysultaine surfactant, a cocoamidopropyl dimethylamine oxide surfactant, sodium chloride, and water; hydrolyzed keratin; mixtures of an ethoxylated alcohol ether sulfate surfactant, an alkyl or alkene amidopropyl betaine surfactant, and an alkyl or alkene dimethylamine oxide surfactant; aqueous solutions of an alpha-olefinic sulfonate surfactant and a betaine surfactant; and combinations thereof.

Optionally, strength-retrogression additives may be included the cement composition to, for example, prevent the retrogression of strength after the cement composition has been allowed to develop compressive strength when the cement composition is exposed to high temperatures. These additives may allow the cement compositions to form as intended, preventing cracks and premature failure of the cementitious composition. Examples of suitable strength-retrogression additives may include, but are not limited to, amorphous silica, coarse grain crystalline silica, fine grain crystalline silica, or a combination thereof.

Optionally, set accelerators may be included in the cement compositions to, for example, increase the rate of setting reactions. Control of setting time may allow for the ability to adjust to wellbore conditions or customize set times for individual jobs. Examples of suitable set accelerators may include, but are not limited to, aluminum sulfate, alums, calcium chloride, calcium sulfate, gypsum-hemihydrate, sodium aluminate, sodium carbonate, sodium chloride, sodium silicate, sodium sulfate, ferric chloride, or a combination thereof.

Optionally, set retarders may be included in the cement compositions to, for example, increase the thickening time of the cement compositions. Examples of suitable set retarders include, but are not limited to, ammonium, alkali metals, alkaline earth metals, borax, metal salts of calcium lignosulfonate, carboxymethyl hydroxyethyl cellulose, sulfoalkylated lignins, hydroxycarboxy acids, copolymers of 2-acrylamido-2-methylpropane sulfonic acid salt and acrylic acid or maleic acid, saturated salt, or a combination thereof. One example of a suitable sulfoalkylated lignin includes a sulfomethylated lignin.

Optionally, lightweight additives may be included in the cement compositions to, for example, decrease the density of the cement compositions. Examples of suitable lightweight additives include, but are not limited to, bentonite, coal, diatomaceous earth, expanded perlite, fly ash, gilsonite, hollow microspheres, low-density elastic beads, nitrogen, pozzolan-bentonite, sodium silicate, combinations thereof, or other lightweight additives known in the art.

Optionally, gas-generating additives may be included in the cement compositions to release gas at a predetermined time, which may be beneficial to prevent gas migration from the formation through the cement composition before it hardens. The generated gas may combine with or inhibit the permeation of the cement composition by formation gas. Examples of suitable gas-generating additives include, but are not limited to, metal particles (e.g., aluminum powder) that react with an alkaline solution to generate a gas.

Optionally, mechanical-property-enhancing additives may be included in the cement compositions to, for example, ensure adequate compressive strength and long-term structural integrity. These properties can be affected by the strains, stresses, temperature, pressure, and impact effects from a subterranean environment. Examples of mechanical-property-enhancing additives include, but are not limited to, carbon fibers, glass fibers, metal fibers, mineral fibers, silica fibers, polymeric elastomers, latexes, and combinations thereof.

Optionally, lost-circulation materials may be included in the cement compositions to, for example, help prevent the loss of fluid circulation into the subterranean formation. Examples of lost-circulation materials include but are not limited to, cedar bark, shredded cane stalks, mineral fiber, mica flakes, cellophane, calcium carbonate, ground rubber, polymeric materials, pieces of plastic, grounded marble, wood, nut hulls, formica, corncobs, cotton hulls, and combinations thereof.

Optionally, fluid-loss-control additives may be included in the cement compositions to, for example, decrease the volume of fluid that is lost to the subterranean formation. Properties of the cement compositions may be significantly influenced by their water content. The loss of fluid can subject the cement compositions to degradation or complete failure of design properties. Examples of suitable fluid-loss-control additives include, but not limited to, certain polymers, such as hydroxyethyl cellulose, carboxymethylhydroxyethyl cellulose, copolymers of 2-acrylamido-2-methylpropanesulfonic acid and acrylamide or N,N-dimethylacrylamide, and graft copolymers including a backbone of lignin or lignite and pendant groups including at least one member selected from the group consisting of 2-acrylamido-2-methylpropanesulfonic acid, acrylonitrile, and N,N-dimethylacrylamide.

Optionally, defoaming additives may be included in the cement compositions to, for example, reduce tendency for the cement composition to foam during mixing and pumping of the cement compositions. Examples of suitable defoaming additives include, but are not limited to, polyol silicone compounds. Suitable defoaming additives are available from Halliburton Energy Services, Inc., under the product name D-AIR™ defoamers.

Optionally, thixotropic additives may be included in the cement compositions to, for example, provide a cement composition that can be pumpable as a thin or low viscosity fluid, but when allowed to remain quiescent attains a relatively high viscosity. Among other things, thixotropic additives may be used to help control free water, create rapid gelation as the slurry sets, combat lost circulation, prevent "fallback" in annular column, and minimize gas migration. Examples of suitable thixotropic additives include, but are not limited to, gypsum, water soluble carboxyalkyl, hydroxyalkyl, mixed carboxyalkyl hydroxyalkyl either of cellulose, polyvalent metal salts, zirconium oxychloride with hydroxyethyl cellulose, or a combination thereof.

The components of the cement compositions may be combined in any order desired to form a cement composition that can be placed into a subterranean formation. In addition, the components of the cement compositions may be combined using any mixing device compatible with the composition, including a bulk mixer, for example. In one particular example, a cement composition may be prepared by combining the dry components (which may be the cement component, for example) with water. Liquid additives (if any) may be combined with the water before the water is combined with the dry components. The dry components may be dry blended prior to their combination with the water. For example, a dry blend may be prepared that includes the AZC and the other dry cement components. Other suitable techniques may be used for preparation of the cement compositions as will be appreciated by those of ordinary skill in the art in accordance with example examples.

As discussed above, AZC may have a high water requirement per unit mass of AZC. The high water requirement may be beneficial when designing cements with reduced density, as additional water added to reduce density may be taken up by the AZC. A cement composition may be designed by providing a target cement density and a target free water. In some applications, a target free water may be about 0% to about 5% by volume free water. The techniques described herein may allow one of ordinary skill in the art to prepare a cement composition including AZC that is substantially free of free water upon setting. A cement composition may be calculated that meets the density target and the free water target by iteratively generating cement compositions including a hydraulic cement and AZC and comparing the calculated density and free water from water requirement of the hydraulic cement and AZC. The high water requirement of the AZC may also be beneficial when reducing density of a cement composition. A cement composition may be provided that includes a hydraulic cement at an initial density. As one of ordinary skill in the art will appreciate, the density of a cement may be directly correlated to the water content and final compressive strength of the cement composition. As discussed above, the AZC may be included in a cement composition to reduce cementitious material content, such as hydraulic cement, and therefore reduce cost. The cement composition may be prepared by adding additional water and increasing the mass fraction of AZC in the cement composition until the compressive strength of the cement composition is equal to that of the composition that does not contain AZC.

The following statements may describe certain elements of the present disclosure but should not read to be limiting to any particular embodiment.

Statement 1. A method of cementing including: preparing a cement composition comprising water, a hydraulic cement, and an agglomerated zeolite catalyst; placing the cement composition in a subterranean formation.

Statement 2. The method of statement 1 wherein the cement composition has a density of about 11 lb/gal (1318 kg/m$^3$) to about 16 lb/gal (1917 kg/m$^3$).

Statement 3. The method of any of statements 1-2 wherein the hydraulic cement is selected from the group consisting of Portland cements, pozzolana cements, gypsum cements, alumina based cements, silica cements, and any combination thereof.

Statement 4. The method of any of statements 1-3 wherein the agglomerated zeolite catalyst is a spent agglomerated zeolite catalyst, the spent agglomerated zeolite catalyst being a product of fluidized catalytic cracking.

Statement 5. The method any of statements 1-4 wherein the agglomerated zeolite catalyst includes a matrix, a filler, a binder, and zeolite crystals.

Statement 6. The method any of statements 1-5 wherein the matrix includes type x, type y, ultra-stable type y, ZSM-5, SAPO-11, silicalite-1, mordenite, ferrierite, beta, or combinations thereof.

Statement 7. The method any of statements 1-6 wherein the agglomerated zeolite catalyst is present in an amount of about 1% to about 80% by weight of the cement composition.

Statement 8. A method of reducing a cement density including: providing a cement composition comprising water and a hydraulic cement, the cement composition having an initial density; adding additional water and an AZC to the cement composition until the cement composition reaches a target density; and placing the cement composition.

Statement 9. The method of statement 8 wherein the hydraulic cement is selected from the group consisting of Portland cements, pozzolana cements, gypsum cements, alumina based cements, silica cements, and combination thereof.

Statement 10. The method of any of statements 8-9 wherein the AZC is a spent agglomerated zeolite catalyst, the spent AZC being a product of fluidized catalytic cracking.

Statement 11. The method of any of statements 8-10 wherein the AZC includes a matrix, a filler, a binder, and zeolite crystals.

Statement 12. The method of any of statements 8-11 wherein the matrix includes type x, type y, ultra-stable type y, ZSM-5, SAPO-11, silicalite-1, mordenite, ferrierite, beta, or combinations thereof.

Statement 13. The method of any of statements 8-12 wherein the target cement density is about 10 lb/gal (1198 kg/m$^3$) to about 13 lb/gal (1558 kg/m$^3$).

Statement 14. A cement composition including: a cementitious component comprising at least 80% by weight agglomerated zeolite catalyst; lime; and water, wherein an AZC to lime weight ratio is about 1:3 to about 1:5.

Statement 15. The composition of statement 14 wherein the cementitious component further includes a hydraulic cement selected from the group consisting of Portland cements, pozzolana cements, gypsum cements, alumina based cements, silica cements, and combination thereof.

Statement 16. The composition of any of statements 14-15 wherein the AZC is a spent agglomerated zeolite catalyst, the spent AZC being a product of fluidized catalytic cracking.

Statement 17. The composition of any of statements 14-16 wherein the AZC includes a matrix, a filler, a binder, and zeolite crystals.

Statement 18. The composition of any of statements 14-17 wherein the matrix includes type x, type y, ultra-stable type y, ZSM-5, SAPO-11, silicalite-1, mordenite, ferrierite, beta, or combinations thereof.

Statement 19. The composition of any of statements 14-18 wherein the matrix is an amorphous solid comprising kaolin filler and silica sol binder, wherein the filler is a clay, and wherein the binder is an aluminate compound.

Statement 20. The composition of any of statements 14-19 wherein the AZC is present in an amount greater than about 90% by weight of the cement component.

Figure 2:
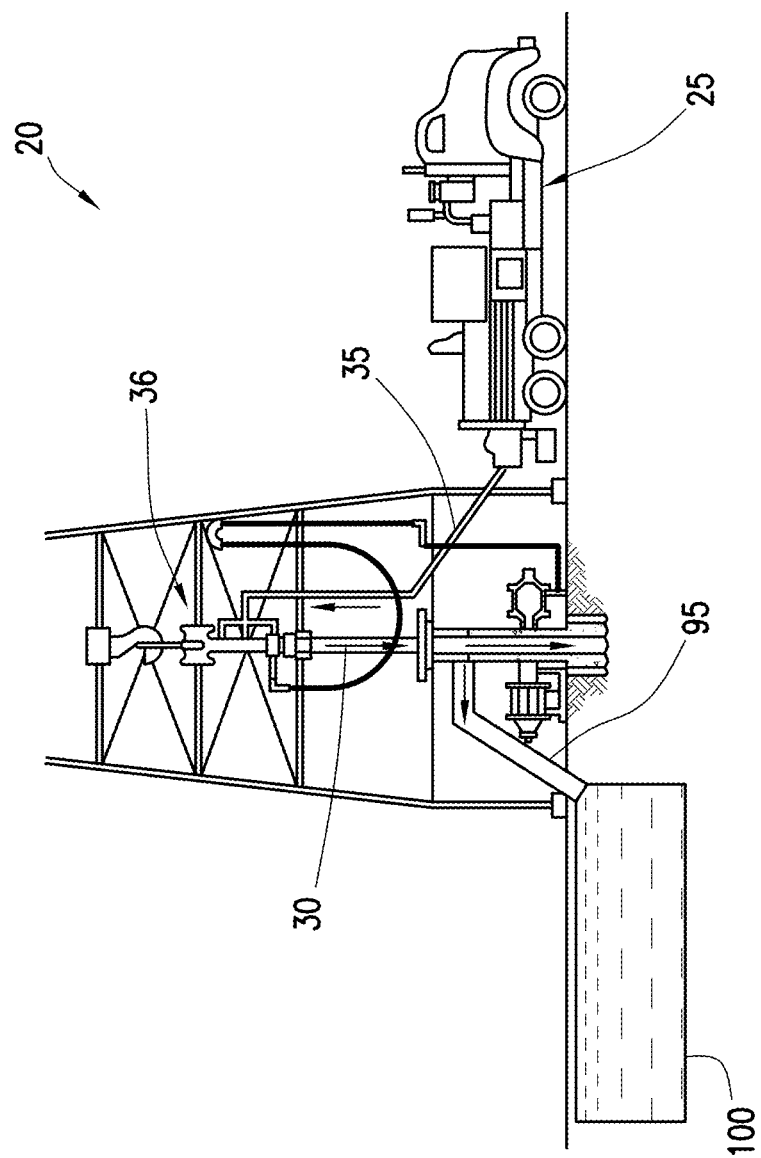
FIG. 2 is a schematic illustration of example surface equipment that may be used in the placement of a cement composition com including agglomerated zeolite catalyst in a wellbore.

Example methods of using the AZC in well cementing will now be described in more detail with reference to FIGS. 1-3. FIG. 1 illustrates an example system 5 for preparation of a cement composition including water and a cement component including AZC and delivery of the cement composition to a wellbore. As shown, the cement composition may be mixed in mixing equipment 10, such as a jet mixer, re-circulating mixer, or a batch mixer, for example, and then pumped via pumping equipment 15 to the wellbore. In some examples, the mixing equipment 10 and the pumping equipment 15 may be disposed on one or more cement trucks as will be apparent to those of ordinary skill in the art. In some examples, a jet mixer may be used, for example, to continuously mix a dry blend including the cement component, for example, with the water as it is being pumped to the wellbore.

An example technique for placing a cement composition into a subterranean formation will now be described with reference to FIGS. 2 and 3. FIG. 2 illustrates example surface equipment 20 that may be used in placement of a cement composition. It should be noted that while FIG. 2 generally depicts a land-based operation, those skilled in the art will readily recognize that the principles described herein are equally applicable to subsea operations that employ floating or sea-based platforms and rigs, without departing from the scope of the disclosure. As illustrated by FIG. 2, the surface equipment 20 may include a cementing unit 25, which may include one or more cement trucks. The cementing unit 25 may include mixing equipment 10 and pumping equipment 15 (e.g., FIG. 1) as will be apparent to those of ordinary skill in the art. The cementing unit 25 may pump a cement composition 30, which may include water and a cement component including agglomerated zeolite catalyst, through a feed pipe 35 and to a cementing head 36 which conveys the cement composition 30 downhole.

Figure 3:
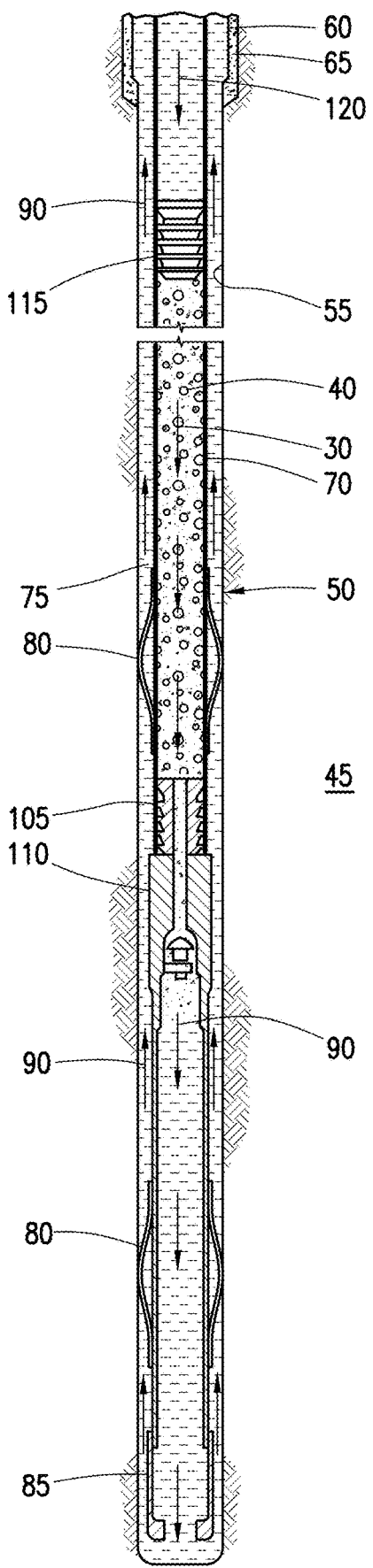
FIG. 3 is a schematic illustration of the example placement of a cement composition including agglomerated zeolite catalyst into a wellbore annulus.

Turning now to FIG. 3, the cement composition 30, which may include the AZC, may be placed into a subterranean formation 45 in accordance with example examples. As illustrated, a wellbore 50 may be drilled into one or more subterranean formations 45. While the wellbore 50 is shown extending generally vertically into the one or more subterranean formation 45, the principles described herein are also applicable to wellbores that extend at an angle through the one or more subterranean formations 45, such as horizontal and slanted wellbores. As illustrated, the wellbore 50 includes walls 55. In the illustrated example, a surface casing 60 has been inserted into the wellbore 50. The surface casing 60 may be cemented to the walls 55 of the wellbore 50 by cement sheath 65. In the illustrated example, one or more additional conduits (e.g., intermediate casing, production casing, liners, etc.), shown here as casing 70 may also be disposed in the wellbore 50. As illustrated, there is a wellbore annulus 75 formed between the casing 70 and the walls 55 of the wellbore 50 and/or the surface casing 60. One or more centralizers 80 may be attached to the casing 70, for example, to centralize the casing 70 in the wellbore 50 prior to and during the cementing operation.

With continued reference to FIG. 3, the cement composition 30 may be pumped down the interior of the casing 70. The cement composition 30 may be allowed to flow down the interior of the casing 70 through the casing shoe 85 at the bottom of the casing 70 and up around the casing 70 into the wellbore annulus 75. The cement composition 30 may be allowed to set in the wellbore annulus 75, for example, to form a cement sheath that supports and positions the casing 70 in the wellbore 50. While not illustrated, other techniques may also be utilized for introduction of the cement composition 30. By way of example, reverse circulation techniques may be used that include introducing the cement composition 30 into the subterranean formation 45 by way of the wellbore annulus 75 instead of through the casing 70.

As it is introduced, the cement composition 30 may displace other fluids 90, such as drilling fluids and/or spacer fluids that may be present in the interior of the casing 70 and/or the wellbore annulus 75. At least a portion of the displaced fluids 90 may exit the wellbore annulus 75 via a flow line 95 and be deposited, for example, in one or more retention pits 100 (e.g., a mud pit), as shown on FIG. 2. Referring again to FIG. 3, a bottom plug 105 may be introduced into the wellbore 50 ahead of the cement composition 30, for example, to separate the cement composition 30 from the other fluids 90 that may be inside the casing 70 prior to cementing. After the bottom plug 105 reaches the landing collar 110, a diaphragm or other suitable device should rupture to allow the cement composition 30 through the bottom plug 105. In FIG. 3, the bottom plug 105 is shown on the landing collar 110. In the illustrated example, a top plug 115 may be introduced into the wellbore 50 behind the cement composition 30. The top plug 115 may separate the cement composition 30 from a displacement fluid 120 and push the cement composition 30 through the bottom plug 105.

The exemplary cement compositions including AZC disclosed herein may directly or indirectly affect one or more components or pieces of equipment associated with the preparation, delivery, recapture, recycling, reuse, and/or disposal of the AZC and associated cement compositions. For example, the AZC may directly or indirectly affect one or more mixers, related mixing equipment, mud pits, storage facilities or units, composition separators, heat exchangers, sensors, gauges, pumps, compressors, and the like used generate, store, monitor, regulate, and/or recondition the cement compositions including AZC and fluids containing the same. The disclosed AZC may also directly or indirectly affect any transport or delivery equipment used to convey the AZC to a well site or downhole such as, for example, any transport vessels, conduits, pipelines, trucks, tubulars, and/or pipes used to compositionally move the AZC from one location to another, any pumps, compressors, or motors (e.g., topside or downhole) used to drive the agglomerated zeolite catalyst, or fluids containing the same, into motion, any valves or related joints used to regulate the pressure or flow rate of the AZC (or fluids containing the same), and any sensors (i.e., pressure and temperature), gauges, and/or combinations thereof, and the like. The disclosed AZC may also directly or indirectly affect the various downhole equipment and tools that may come into contact with the AZC such as, but not limited to, wellbore casings, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, terrorizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like.

EXAMPLES

To facilitate a better understanding of the present disclosure, the following examples of some of the preferred examples are given. In no way should such examples be read to limit, or to define, the scope of the disclosure.

Example 1

A series of cement slurries including Portland cement and AZC were prepared and subjected to compressive strength tests in an ultrasonic cement analyzer. The slurries were prepared at various ratios of Portland cement to AZC at two slurry densities. Table 1 lists the slurries formulated, temperature the slurries were prepared at, and the results of the compressive strength test shown as UCS (ultimate compressive strength).

TABLE 1

| Class A Cement (wt %) | AZC (wt %) | Water (gal/sk) | Density (lb/gal) | Test Temperature (deg F.) | Approximate UCS (psi) |
| --- | --- | --- | --- | --- | --- |
| 100 | — | 5.873 | 14.8 | 185 | 1920 |
| 40 | 60 | 4.076 | 14.8 | 185 | 2356 |
| 50 | 50 | 4.402 | 14.8 | 185 | 2532 |
| 60 | 40 | 4.729 | 14.8 | 185 | 2458 |
| 100 | — | 8.535 | 13.5 | 157 | 615 |

TABLE 1-continued

| Class A Cement (wt %) | AZC (wt %) | Water (gal/sk) | Density (lb/gal) | Test Temperature (deg F.) | Approximate UCS (psi) |
|---|---|---|---|---|---|
| 40 | 60 | 5.943 | 13.5 | 157 | 1045 |
| 50 | 50 | 6.383 | 13.5 | 157 | 1532 |
| 60 | 40 | 6.822 | 13.5 | 157 | 1418 |

Figure 4:
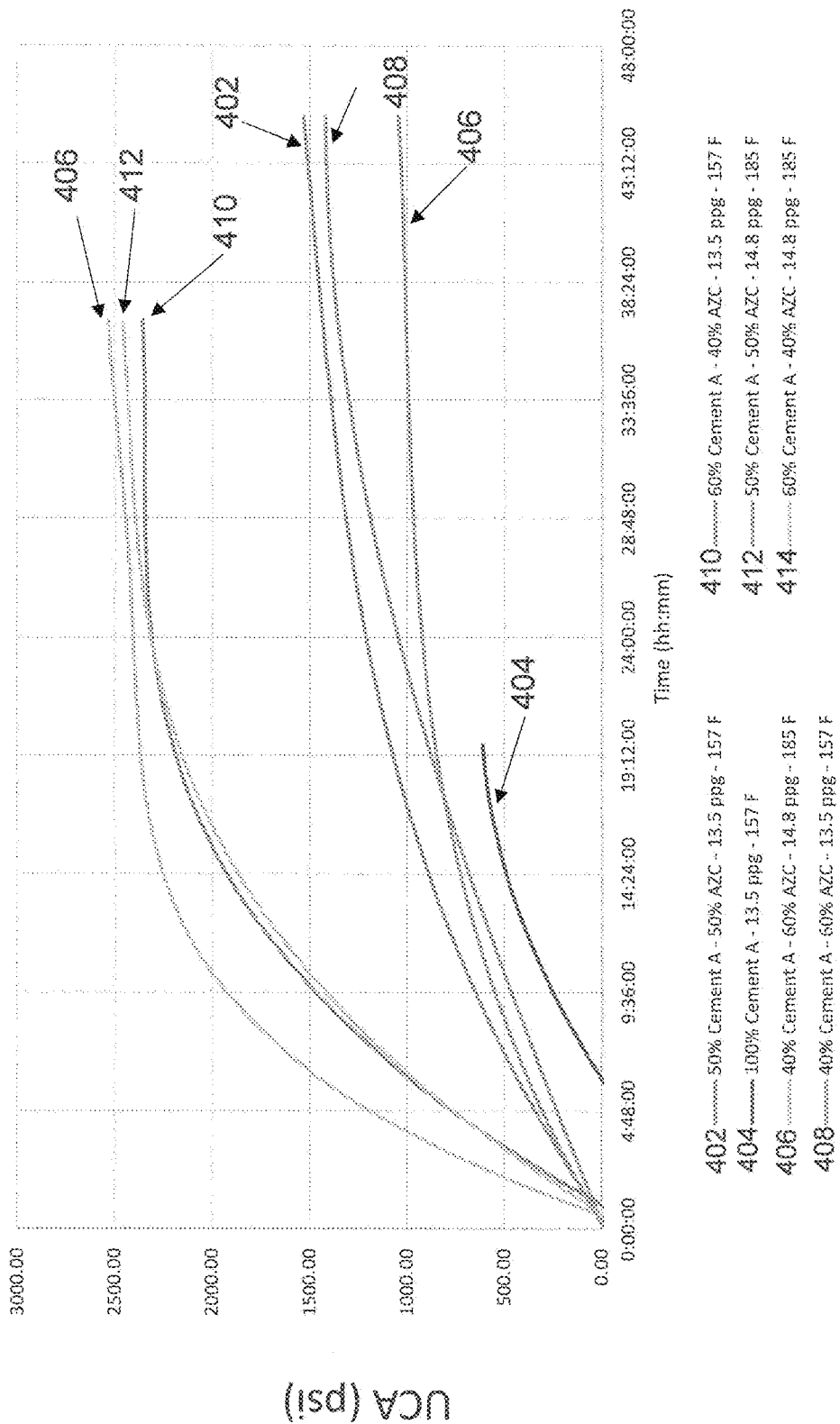
FIG. 4 is a graph illustrating compressive strength over time of cement compositions including agglomerated zeolite catalyst.

In Table 1, the water added is in gallons per sack of cement which is defined by the American Petroleum Institute to be the mass of a dry cement required to take up 1 cubic foot of volume and is dependent on the density of the cement. For the tested slurries, it can be observed that the unconfined compressive strength increases as for all slurries as the ratio of AZC to class A Portland cement is increased. The compressive strength over time of the slurries of Table 1 is illustrated in FIG. 4. In FIG. 4, curve 402 is 50% class A Portland cement and 50% AZC mixed at 13.5 lb/gal and 157° F., curve 404 is 100% class A Portland cement mixed at 13.5 lb/gal and 157° F., curve 406 is 40% class A Portland cement and 60% AZC mixed at 14.8 lb/gal and 158° F., curve 408 is 40% class A Portland cement and 60% AZC mixed at 13.5 lb/gal and 157° F., curve 410 is 60% class A Portland cement and 40% AZC mixed at 13.5 lb/gal and 157° F., curve 412 is 50% class A Portland cement and 50% AZC mixed at 14.8 lb/gal and 185° F., and curve 414 is 60% class A Portland cement and 40% AZC mixed at 14.8 lb/gal and 185° F. For slurries prepared at the same densities and temperatures, each slurry formulated with AZC developed a higher ultimate compressive strength than the corresponding slurry containing only Portland cement. Additionally, it was observed that slurries containing AZC started to set at an increased rate as compared to slurries containing only Portland cement, indicating that AZC may act as an accelerator for Portland cement.

Example 2

A test was performed with low-density cements to evaluate the compressive strength differences between cements prepared with and without agglomerated zeolite catalyst. Two slurries were prepared, one with AZC in Table 2, and one without AZC in Table 3. Each slurry was prepared at 14.8 lb/gal (1773 kg/m$^3$).

TABLE 2

| Material | Weight (g) |
|---|---|
| Type I Cement (40%) | 373.72 |
| AZC (60%) | 339.92 |
| Suspending Aid | 7.14 |
| Defoamer | 0.93 |
| Water | 342.36 |

The slurry formulation from Table 2 had a total volume of 0.6 liter, and the bulk blend contained 713.64 grams of cementitious material leading to a calculated slurry density of (1773 kg/m$^3$). The cementitious materials were dry mixed and then blended with water in a blender to API specifications. The cement slurry was allowed to cure in an ultrasonic cement analyzer for 24 hrs at 220° F. (104° C.) and 3000 psi (20684 kPa).

TABLE 3

| Material | Weight (g) |
|---|---|
| Type I Cement | 687.32 |
| Defoamer | 0.68 |
| Friction Reducer | 2.75 |
| Water | 357.66 |

This slurry formulation from Table 3 had a total volume of 0.6 liter and the bulk blend contained 687.32 grams of cementitious material leading to a calculated slurry density of 14.8 lb/gal (1773 kg/m$^3$). The cementitious materials were dry mixed and then blended with water in a blender to API specifications. The cement slurry was allowed to cure in an ultrasonic cement analyzer for 24 hrs at 220° F. (104° C.) and 3000 psi (20684 kPa).

The results of the test are shown in Table 4. It can be observed that the cement composition including the AZC has approximately 23% higher compressive strength as compared to the cement composition which does not include agglomerated zeolite catalyst. Additionally, the cement composition including the AZC has 60% less cementitious material for the same slurry volume.

TABLE 4

| Cement Formulation | UCA C.S. (24 hr) | Cementitious Materials (g) | Slurry Volume (L) | Slurry Density (lb/gal) |
|---|---|---|---|---|
| With AZC (Table 2) | 2356 psi | 713.6 | 0.6 | 14.8 |
| Without AZC (Table 3) | 1920 psi | 687.3 | 0.6 | 14.8 |

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present disclosure is well adapted to attain the ends and advantages mentioned as well as those that are inherent therein. The examples disclosed above are illustrative only, as the present embodiments may be modified and practiced in different but equivalent manners apparent to those skilled in the art having the benefit of the teachings herein. Although individual examples are discussed, the present disclosure covers all combinations of all those examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the illustrative examples disclosed above may be altered or modified and all such variations are considered within the scope and spirit of the present disclosure. If there is any conflict in the usages of a word or term in this specification and one or more patent(s) or other documents that may be incorporated herein by reference, the definitions that are consistent with this specification should be adopted.

What is claimed is:

1. A method of cementing comprising:
preparing a cement composition comprising water, a hydraulic cement, and an agglomerated zeolite catalyst, wherein the agglomerated zeolite catalyst comprises a matrix, a filler, a binder, and zeolite crystals; and
placing the cement composition in a wellbore.

2. The method of claim 1 wherein the cement composition has a density of about 11 lb/gal (1318 kg/m$^3$) to about 16 lb/gal (1917 kg/m$^3$).

3. The method of claim 1 wherein the hydraulic cement is selected from the group consisting of Portland cements, pozzolana cements, gypsum cements, alumina based cements, silica cements, and any combination thereof.

4. The method of claim 1 wherein the agglomerated zeolite catalyst is a spent agglomerated zeolite catalyst, the spent agglomerated zeolite catalyst being a product of fluidized catalytic cracking.

5. The method of claim 1 wherein the matrix comprises type x, type y, ultra-stable type y, ZSM-5, SAPO-11, silicate-1, mordenite, ferrierite, beta, or combinations thereof.

6. The method of claim 1 wherein the agglomerated zeolite catalyst is present in an amount of about 1% to about 80% by weight of the cement composition.

7. A method of reducing a cement density comprising:
providing a cement composition comprising water and a hydraulic cement, the cement composition having an initial density;
adding additional water and an agglomerated zeolite catalyst to the cement composition until the cement composition reaches a target density, wherein the agglomerated zeolite catalyst comprises a matrix, a filler, a binder, and zeolite crystals; and
placing the cement composition in a wellbore.

8. The method of claim 7 wherein the hydraulic cement is selected from the group consisting of Portland cements, pozzolana cements, gypsum cements, alumina based cements, silica cements, and any combination thereof.

9. The method of claim 7 wherein the agglomerated zeolite catalyst is a spent agglomerated zeolite catalyst, the spent agglomerated zeolite catalyst being a product of fluidized catalytic cracking.

10. The method of claim 7 wherein the matrix comprises type x, type y, ultra-stable type y, ZSM-5, SAPO-11, silicate-1, mordenite, ferrierite, beta, or combinations thereof.

11. The method of claim 7 wherein the target cement density is about 10 lb/gal to about 13 lb/gal.

12. A cement composition comprising:
a cementitious component comprising at least 80% by weight agglomerated zeolite catalyst, wherein the agglomerated zeolite catalyst comprises a matrix, a filler, a binder, and zeolite crystals;
lime; and
water, wherein an agglomerated zeolite catalyst to lime weight ratio is about 1:3 to about 1:5.

13. The composition of claim 12 wherein the cementitious component further comprises a hydraulic cement selected from the group consisting of Portland cements, pozzolana cements, gypsum cements, alumina based cements, silica cements, and any combination thereof.

14. The composition of claim 12 wherein the agglomerated zeolite catalyst is a spent agglomerated zeolite catalyst, the spent agglomerated zeolite catalyst being a product of fluidized catalytic cracking.

15. The composition of claim 12 wherein the matrix comprises type x, type y, ultra-stable type y, ZSM-5, SAPO-11, silicate-1, mordenite, ferrierite, beta, or combinations thereof.

16. The composition of claim 12 wherein the matrix is an amorphous solid comprising kaolin filler and silica sol binder, wherein the filler is clay, and wherein the binder is an aluminate compound.

17. The composition of claim 12 wherein the agglomerated zeolite catalyst is present in an amount greater than about 90% by weight of the cement component.

* * * * *